March 5, 1940.   A. SOMMER   2,192,418
METHOD OF MANUFACTURING PHOTOELECTRICALLY SENSITIVE LAYERS
Filed June 5, 1939
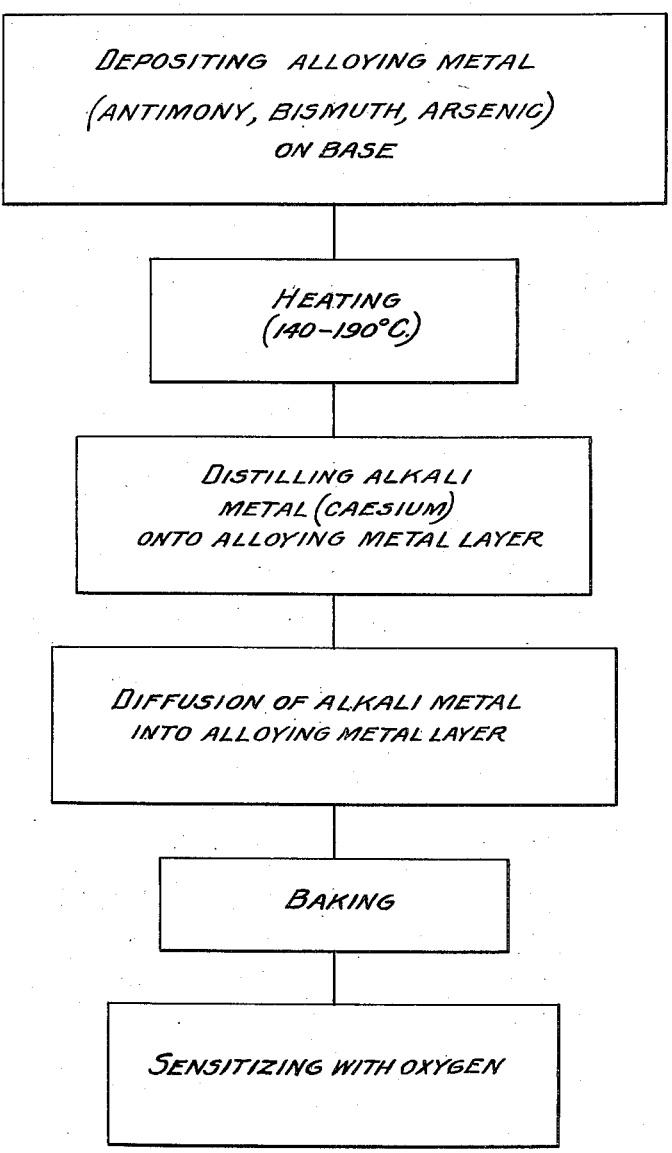
INVENTOR
Alfred Sommer
BY
ATTORNEY Patented Mar. 5, 1940

2,192,418

UNITED STATES PATENT OFFICE 2,192,418

METHOD OF MANUFACTURING PHOTOELECTRICALLY SENSITIVE LAYERS

Alfred Sommer, London, England, assignor to Baird Television Limited, London, England, a British company Application June 5, 1939, Serial No. 277,441
In Great Britain December 15, 1938

9 Claims. (Cl. 250—27.5)

This invention relates to improvements in methods of manufacturing photoelectrically sensitive layers and is especially concerned with a method of manufacturing sensitive layers comprising an alkali metal.

According to one feature of the present invention there is provided a method of manufacturing a photoelectrically sensitive layer which comprises depositing on a supporting member a layer of a metal with which an alkali metal will form an alloy, distilling the said alkali metal on to said layer while maintaining it at a temperature such that the alkali may diffuse into and form an alloy with the layer, baking the composite layer thus produced and thereafter sensitising with oxygen in known manner.

According to another feature of the present invention there is provided a method of manufacturing a photoelectrically sensitive layer which comprises alternately depositing upon a supporting member an alkali metal and a metal with which the said alkali metal will form an alloy while maintaining the deposited layer at a temperature such as to assist interdiffusion of the two metals, baking the composite layer thus produced and thereafter sensitising it with oxygen in known manner.

According to another feature of the present invention there is provided a method of manufacturing a photoelectrically sensitive layer which comprises simultaneously depositing upon a supporting member an alkali metal and a metal with which the said alkali metal will form an alloy while maintaining the deposited layer at a temperature such as to assist interdiffusion of the two metals, baking the composite layer thus produced and thereafter sensitising it with oxygen in known manner.

According to another feature of the present invention there is provided a method of manufacturing a photoelectric device which includes a primary photosensitive cathode and an electron multiplier comprising one or more secondary emitting electrodes, which method comprises the steps of oxidising the secondary emitting electrodes of the electron multiplier, distilling caesium on to the said secondary emitting electrodes, evaporating antimony to form the basic layer of the primary cathode, distilling caesium on to the antimony while the latter is maintained at a temperature such that the caesium may diffuse into and form an alloy with it, baking and finally oxidation.

In carrying out the present invention antimony may conveniently be employed as the basic material and caesium as the alkali metal in which case a photoelectrically sensitive layer may be manufactured in accordance with the present invention as follows. The layer of antimony is deposited on a supporting member and is then heated to a temperature in the region of 140–190° C. while caesium is slowly distilled onto it until the photoelectric sensitivity is a maximum, this temperature being dependent upon the stationary vapour pressure of caesium in the vessel in which deposition is being effected. This pressure is determined by other factors than temperature, for example the width of the constrictions between the vessel and the caesium container and between the vessel and the pumping system. During the distillation of the caesium, the temperature of the antimony layer is such that the caesium does not condense as a layer on the surface but diffuses into the body of the layer. The composite layer thus produced is baked for a short period and is then sensitised with oxygen in known manner.

It may be found convenient or advantageous to employ some metal other than antimony, particularly for example bismuth or arsenic, which forms an alloy with alkali metals, the temperature at which the layer is maintained during the deposition of the alkali metal being appropriately altered if necessary.

In some cases it may be found convenient to alter the above described method by evaporating the base metal and the alkali metal alternately as the alkali metal has then to diffuse only into a thin layer of base metal so that it is more easily possible to obtain a desired ratio of alkali metal to base metal. By simultaneous evaporation of the alkali metal and base metal substantially perfect uniformity of the photoelectrically sensitive layer is obtainable while the ratio of alkali metal to base metal may be adjusted by varying the temperatures of the sources from which the two metals are evaporated. In this case the method of manufacturing may conveniently be as follows. An envelope containing, or itself comprising, the supporting member, is evacuated. Caesium is then distilled into the vessel from a side tube which is suitably heated, for example by enclosing the envelope in an oven which is raised to an appropriate temperature while antimony is simultaneously evaporated in the envelope from a wire helix containing a pellet of that metal. By suitably adjusting the respective rates of evaporation of antimony and caesium during deposition of a layer having a very high sensitivity after the usual sensitising process has been completed may be obtained.

A photoelectric device comprising a photoelectrically sensitive surface in accordance with the present invention and including also an electron multiplier comprising secondary emitting electrodes may be manufactured by oxidising the secondary emitting electrodes of the electron multiplier, distilling caesium onto the said secondary emitting electrodes, evaporating antimony to form the basic layer of the primary cathode, distilling caesium onto the antimony while the latter is maintained at a temperature such that the caesium may diffuse into and form an alloy with it, baking and finally oxidation. It is possible, but more difficult, to combine the two sensitising processes, i. e., to evaporate the antimony before the caesium is introduced. Of course, where caesium is mentioned above it is possible to replace it with another of the alkali metals, and other metals with which caesium or another alkali metal will form an alloy may replace the antimony.

Preferably the antimony is evaporated on to an appropriate portion of the envelope of the device, or on to a suitable supporting member from a heated spiral while the caesium is introduced into the vessel from a side tube in manner known in the art.

During the deposition of caesium on the multiplier electrodes the temperature may conveniently be about 180° C. while during the deposition of the caesium on the antimony the latter is preferably maintained at a temperature between 140 and 200° C.

The drawing is a flow sheet of the processes described.

I claim:

1. The method of manufacturing a photoelectrically sensitive layer which comprises depositing on a supporting member a layer of a metal with which an alkali metal will form an alloy, distilling the said alkali metal on to said layer while maintaining it at a temperature such that the alkali metal may diffuse into and form an alloy with the layer, baking the composite layer thus produced and thereafter sensitising with oxygen in known manner.

2. The method of manufacturing a photoelectrically sensitive layer which comprises simultaneously depositing upon a supporting member an alkali metal and a metal with which the said alkali metal will form an alloy while maintaining the deposited layer at a temperature such as to assist interdiffusion of the two metals, baking the composite layer thus produced and thereafter sensitising it with oxygen in known manner.

3. The method of manufacturing a photoelectrically sensitive layer which comprises alternately depositing upon a supporting member an alkali metal and a metal with which the said alkali metal will form an alloy while maintaining the deposited layer at a temperature such as to assist interdiffusion of the two metals, baking the composite layer thus produced and thereafter sensitising it with oxygen in known manner.

4. The method of manufacturing a photoelectric device which includes a primary photosensitive cathode and an electron multiplier comprising one or more secondary emitting electrodes, which method comprises the steps of oxidising the secondary emitting electrodes of the electron multiplier, distilling caesium on to the said secondary emitting electrodes, evaporating antimony to form the basic layer of the primary cathode, distilling caesium on to the antimony while the latter is maintained at a temperature such that the caesium may diffuse into and form an alloy with it, baking and finally oxidation.

5. The method of manufacturing a photoelectrically sensitive layer which comprises depositing on a supporting member a layer of antimony, distilling caesium on to the said layer, maintaining the said layer at a temperature such that the caesium diffuses into and forms an alloy with it, baking the alloy layer and sensitising the alloy layer by oxidation.

6. The method of manufacturing a photoelectrically sensitive layer which comprises alternately depositing upon a supporting member antimony and caesium, maintaining the deposited metals at a temperature such as to assist interdiffusion thereof, baking the deposited layer and then sensitising with oxygen.

7. The method of manufacturing a photoelectrically sensitive layer which comprises simultaneously depositing upon a supporting member antimony and caesium, maintaining the deposited metals at a temperature such as to assist interdiffusion thereof, baking the deposited layer and then sensitising with oxygen.

8. The method of manufacturing a photoelectrically sensitive layer which comprises depositing a layer of antimony on a supporting member, heating the said layer to a temperature between 140 and 190° C., slowly distilling caesium on to said layer until the photoelectric sensitivity is a maximum, baking the layer thus produced, and sensitising the layer with oxygen.

9. The method of manufacturing a photoelectrically sensitive surface which comprises enclosing a supporting member in a container, evacuating said container, evaporating a layer of antimony on to said supporting member, heating said layer, evaporating caesium to diffuse into said layer, baking said layer and oxidising the surface of said layer.

ALFRED SOMMER.